Aug. 23, 1949.    J. B. BEACH    2,479,713
CANOPY CONTROL AND JETTISONING MECHANISM
Filed Dec. 13, 1947    3 Sheets-Sheet 1
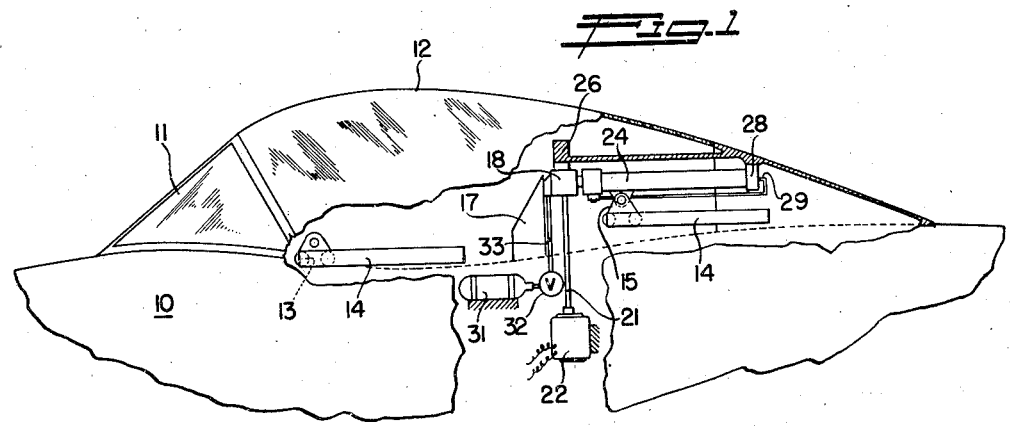
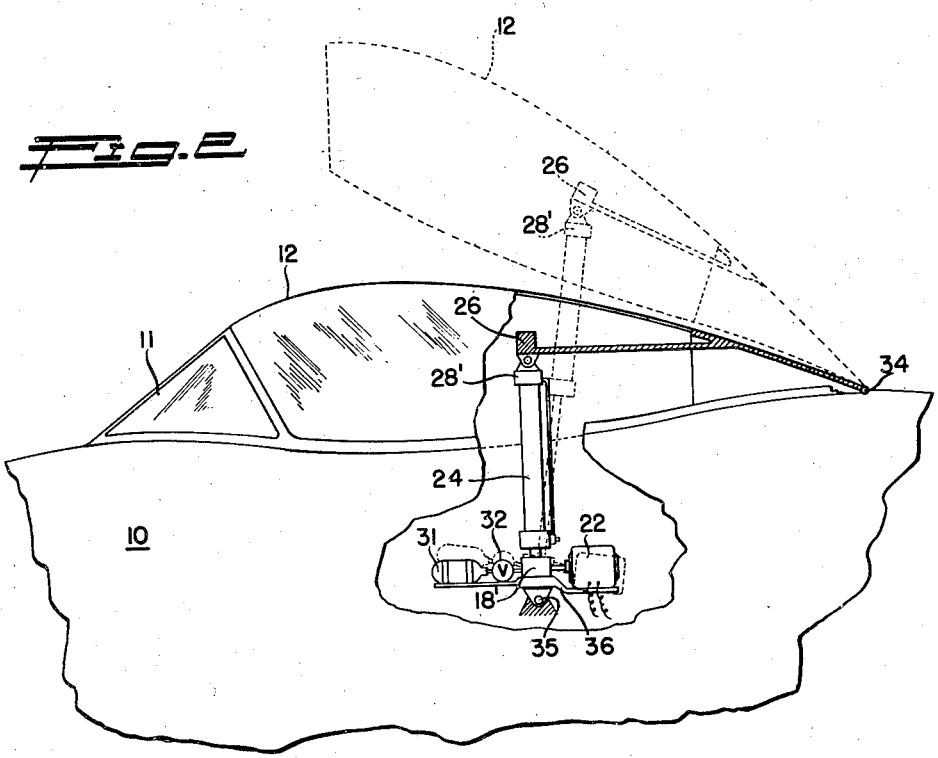
INVENTOR.
JAMES B. BEACH
BY
Agent Aug. 23, 1949.  J. B. BEACH  2,479,713
CANOPY CONTROL AND JETTISONING MECHANISM
Filed Dec. 13, 1947  3 Sheets-Sheet 2
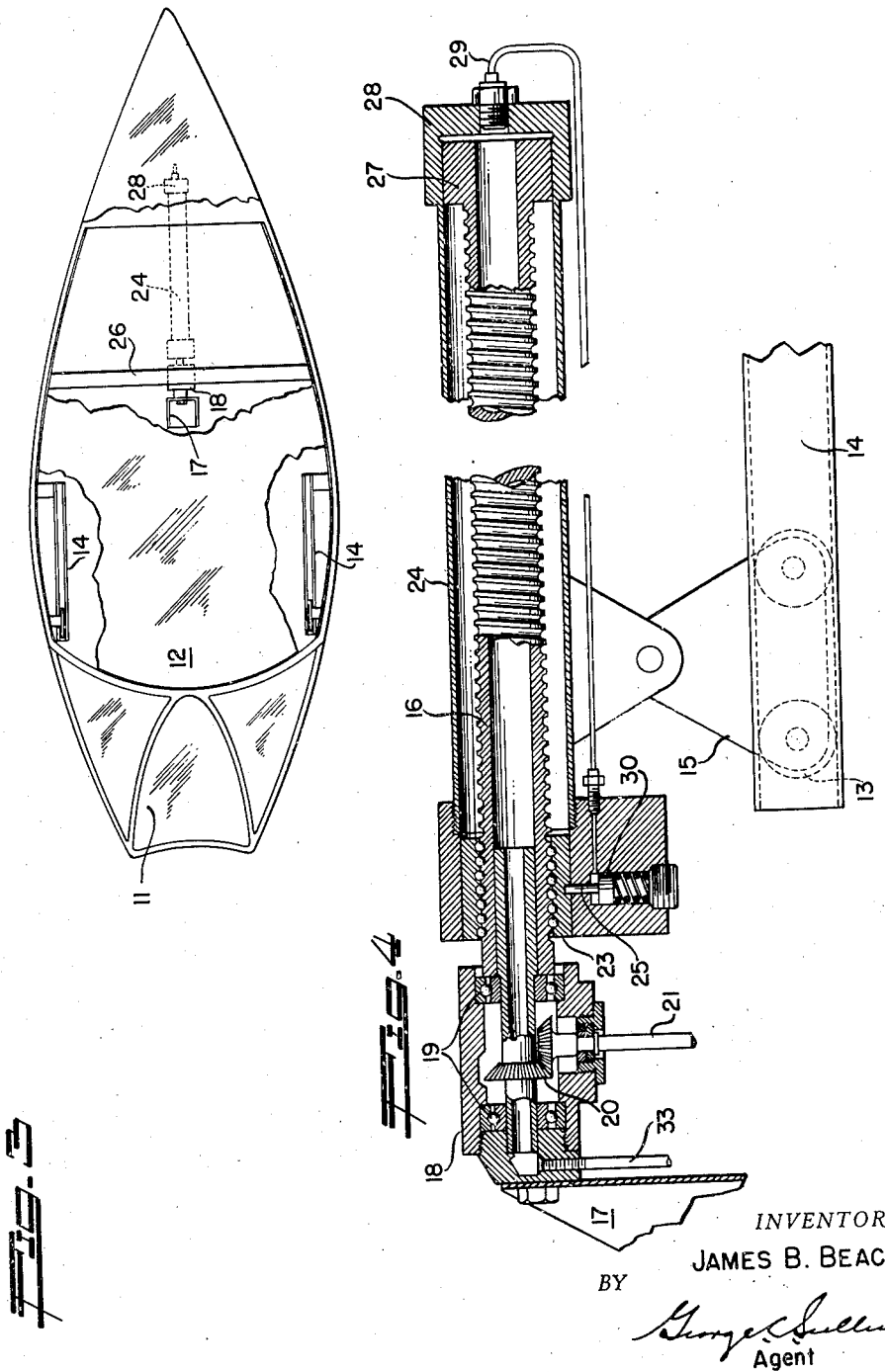
INVENTOR.
JAMES B. BEACH
BY
George E. Sullivan
Agent Aug. 23, 1949.  J. B. BEACH  2,479,713
CANOPY CONTROL AND JETTISONING MECHANISM
Filed Dec. 13, 1947  3 Sheets-Sheet 3
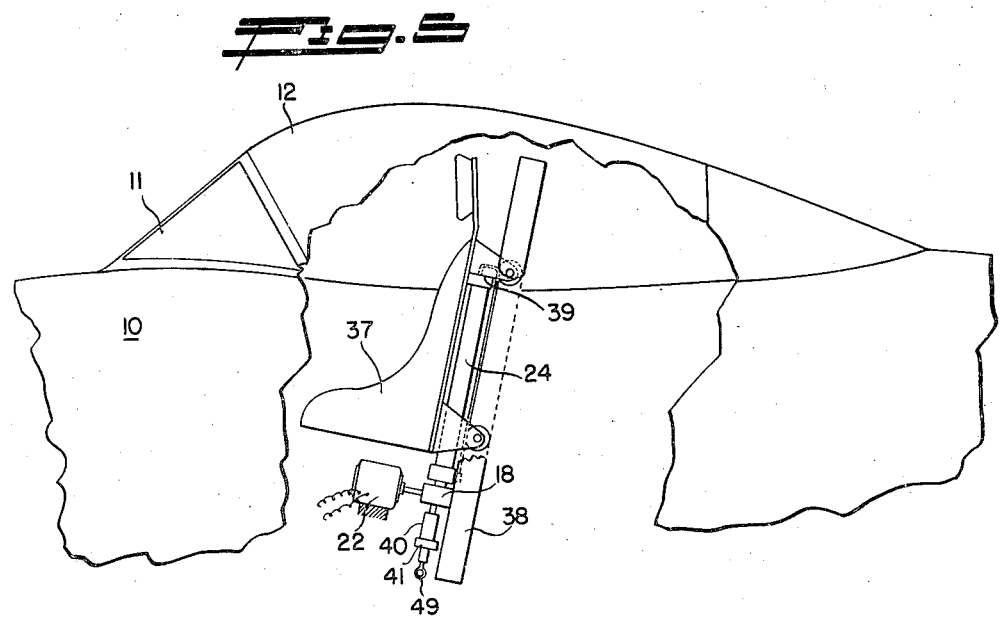
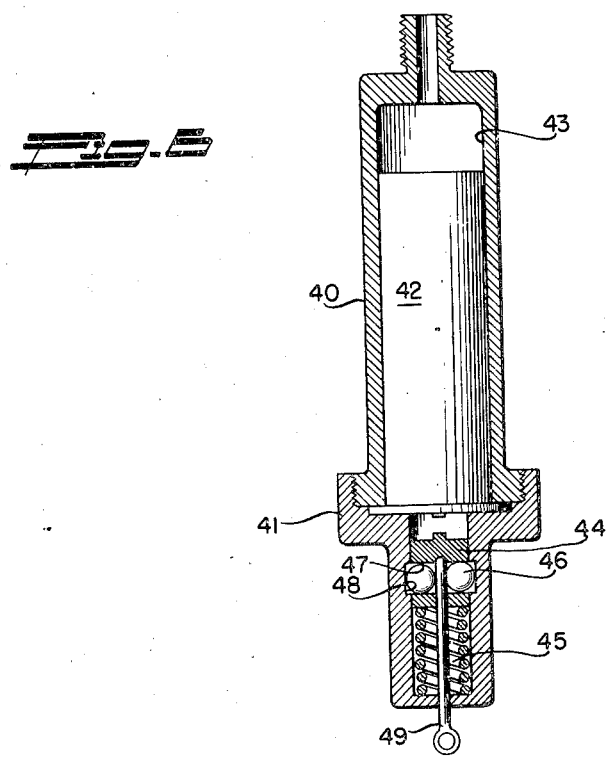
INVENTOR.
JAMES B. BEACH
BY
George C. Sullivan
Agent Patented Aug. 23, 1949

2,479,713

UNITED STATES PATENT OFFICE 2,479,713

CANOPY CONTROL AND JETTISONING MECHANISM

James B. Beach, North Hollywood, Calif., assignor to Lockheed Aircraft Corporation, Burbank, Calif.

Application December 13, 1947, Serial No. 791,570

7 Claims. (Cl. 244—121)

This invention relates to an improved operating and jettisoning mechanism for aircraft and the like, and in one embodiment has particular reference to a normal operating mechanism for opening and closing a hatch, enclosure, or canopy as by sliding or hinged motion thereof, which mechanism also includes an emergency jettisoning or catapult arrangement providing for further sliding or hinged motion of such hatch, enclosure, or canopy to completely clear the exit opening. In another embodiment the device of this invention combines normal adjustment of a component with emergency jettisoning thereof, as in the case of a pilot's seat, for example.

It is one of the objects of this invention to provide a canopy or hatch operating mechanism of the type described permitting the pilot or occupant to adjust the opening or closing motion thereof to any point in its normal range of operation, whether for entry or exit, or for ventilation or improved view. This has special reference to sliding canopies as far as operation in flight is concerned, although hinged escape hatches and the like may be so operated when the airplane is not in flight.

It is a further object of this invention to provide a canopy or hatch operating mechanism of the type described incorporating jettisoning means for disconnecting the normal operating mechanism to provide substantially instantaneous operation thereof beyond the extreme normal operating position whereby to disengage or release the canopy or hatch to jettison the same in an emergency. In the case of a sliding canopy it would be ejected to the rear of the guiding tracks therefor and into the air stream, and in the case of a hinged hatch would allow the air stream to swing the hatch back against the airplane structure or carry it away to completely clear the opening therefor.

It is another object of this invention to provide a positive jettisoning mechanism associated with a normal operating mechanism in such a way as to provide an emergency overtravel of such mechanism to jettison or discharge equipment from associated structure.

Jettisonable canopies have been proposed heretofore wherein the sliding canopy may be released from its carriage. However, such release means depend upon aerodynamic suction induced by air flow over the windshield and canopy to lift the latter upwards when released. My invention, when applied to the operation of sliding canopies, provides for rearward ejection or catapulting of the canopy independent of any air forces acting externally thereof and is therefore positive in action, controlling the movement of the canopy to prevent inadvertent or unexpected movements of the canopy prior to clearing the opening. Also, in the case of a hinged hatch or the like the hatch will be opened or thrown back clear of the opening, without dependence on air flow for such action. Thus my operating mechanism will function at all times as it is not dependent on aerodynamic forces, or internal pressure behind the canopy or hatch.

Jettisonable pilot seats have also been proposed heretofore wherein the seat is normally vertically adjustable for different pilots, but must be lowered to its limit before the jettisoning operation can be accomplished.

In the accompanying drawings a preferred embodiment of my operating mechanism is shown in connection with both sliding and hinged canopies. It will, of course, be appreciated that the invention is susceptible of incorporation in other structurally modified forms within the spirit of the invention and scope of the appended claims.

In the drawings:

Figure 1 is a side view of a sliding cockpit canopy partly broken away to show the operating mechanism of this invention;

Figure 2 shows the operating mechanism of this invention applied to a hinged canopy;

Figure 3 is a plan view of the sliding canopy of Figure 1;

Figure 4 is an enlarged detail of the operating mechanism of this invention;

Figure 5 is a side elevation of a jettisonable pilot's seat embodying an explosive cartridge variation of the mechanism of this invention; and Figure 6 is an enlarged fragmentary detail of an explosive cartridge mechanism suitable for use with the several embodiments of my invention.

I have shown the device of this invention as applied to both sliding and hinged cockpit canopies and to a jettisonable pilot's seat; other applications of the device being readily apparent to those skilled in the art.

The cockpit enclosures of Figures 1 and 2 are substantially identical, the difference residing in the sliding or hinged mounting of the part to be jettisoned. Accordingly, the same reference numerals will be applied to parts common to both figures, where the cockpit region of an airplane fuselage 10 is provided with a fixed windshield 11 and a movable free blown canopy 12 which, in its closed position, mates at its forward end with the complementary edge of the windshield.

In the sliding version of Figure 1 the canopy is supported by rollers 13 engaging in tracks 14, roller carriages 15 and tracks 14 being provided near each forward edge of the canopy and centrally of the trailing edge, the roller carriage 15 at the latter point being conveniently utilized as part of the operating mechanism to be described hereinafter. It will be understood that the canopy shown is particularly suitable for fighter type airplanes wherein access to the cockpit is obtained by sliding the canopy back, and that the pilot may also desire to partially open the cockpit for ventilation, improved vision, or conversation with ground personnel during ground handling.

The actuator of this invention combines a screw or jack mechanism for normal operation and a pneumatic cylinder and piston for projecting or catapulting the canopy or hatch beyond the operating limits of the screw adjustment. For convenience, the two functions will be described separately although parts are common to both.

The normal operating mechanism that is reversible and adapted to adjust and lock the canopy at any point within the normal limits of travel, comprises a rotatable screw jack 16 anchored to a bracket 17 attached to a fixed part of the airplane structure. Referring to Figure 4, a housing 18 bolted to the bracket 17, contains bearings 19 for the screw jack 16, which, for convenience, is shown with a right angle drive comprising bevel gears 20 and a driving shaft 21 which may be manually or power actuated, as by a reversible electric motor 22 shown in Figure 1.

The threaded screw jack 16 operates in a nut 23 normally held in the open end of a cylinder 24 by a locking pin 25. While an ordinary power type of thread could be used, I have shown a ball-bearing type of thread and nut as this materially decreases the operating friction. The cylinder 24 in turn may be conveniently supported on the rear roller carriage 15 and is rigidly attached to some part of the movable canopy 12 such as a cross frame 26 as shown in Figure 1. Thus the cylinder moves as a unit with the canopy when the screw jack is rotated, and both members are of such length as to provide the desired normal maximum range of movement of the canopy. The roller tracks are also of equivalent length so that for all such normal movements of the canopy it will be guided by the tracks.

The jettisoning or catapulting action to be now described is intended to move the canopy backwards until the cylinder 24 moves off the far end of the jack screw 16 and the rollers 13 emerge from the rear ends of the tracks 14, at which time the canopy becomes entirely disengaged from the airplane completely clearing the cockpit exit, regardless of whether the airplane is in motion or the canopy subject to aerodynamic forces or internal pressures.

To this end, the far end of the jack screw 16 is provided with a piston head 27 slidable in the cylinder 24, and provision is made to introduce a compressed fluid, preferably a gas, through the hollow jack screw into the space between the piston head 27 and an end closure 28 for the cylinder. A fluid connection 29 leads from the end closure 28 to a piston 30 associated with the nut locking pin 25 to retract the latter upon the introduction of fluid pressure. With the pin 25 retracted the nut is released and the cylinder 24 is free to blow off the jack screw and its piston head 27 upon the continued application of fluid pressure.

Any source of pressure fluid may be used to accomplish such jettisoning action, such as bottled air or gas, or an explosive cartridge such as used in the Breeze engine starter, a variation of which will be hereinafter described in connection with a jettisonable seat. I have shown a bottle 31 of compressed gas, a control valve 32 therefor and a pressure line 33 leading into the hollow jack screw 16 for illustrative purposes, any convenient or available source and type of pressure fluid such, for example, as air or carbon dioxide, being suitable for my purpose.

The modification of Figure 2 shows the canopy 12 hinged to the fuselage at 34. For normal access and exit the canopy would be moved upward to the dotted line position, and for emergency exit would be swung back approximately 180°. In fact, if used for emergency exit in flight, the airstream, catching under the forward edge of the canopy as it started to lift, would be likely to tear it free at the hinge 34.

In order to adapt the before described operating mechanism of this invention to such a hinged canopy or hatch, the cylinder head 28' is pivoted to the canopy bridge 26, and the jack housing 18' is pivoted at 35 to a fixed part of the airplane. In this case the gas bottle 31 and driving motor 22, previously described, are mounted on a bracket 36 moving with the housing 18. In other respects the operating mechanism may be identical with that previously described; normal operation of the motor 22 adjusting the canopy between the full and dotted lines of Figure 2, while discharge of the emergency gas bottle blows the cylinder 24 off the end of the jack screw 16.

In Figures 5 and 6 I have shown my device as applied to a vertically adjustable pilot's seat 37 adapted to be jettisoned in an emergency. In this version I have also shown an explosive cartridge mechanism detailed in Figure 6, intended to be interchangeable with the gas bottles 31 previously described.

The seat 37 is vertically adjustable along tracks 38 by means of the previously described jack screw 16 and cylinder 24 combination, the cylinder being attached to the seat back at 39. The normal vertical adjustment so provided enables the pilot to adjust the seat to suit his physical characteristics.

As an alternative to the gas bottle 31 previously described, I have shown an explosive cartridge actuated mechanism comprising a two-part casing 40 and 41 designed to accommodate a blank cartridge shell 42, preferably having a slow burning powder load, to reduce the initial shock of discharge. The casing 40 contains the shell 42 and a discharge chamber 43 connected in any suitable manner to the pressure line 33, or directly into the end housing 18.

Firing of the cartridge 42 is accomplished by a firing pin 44 in the casing part 41. The firing pin is normally held retracted, against the force of a spring 45, by means of balls 46 in a transverse hole 47 through the firing pin, the balls being held out into engagement with a groove 48 in the wall of the casing part 41 by a central pin 49, withdrawal of which pin releases the balls and firing pin to strike the cap of the shell 42. With this arrangement, pulling the pin 49 serves to jettison the seat and pilot through the canopy opening in the same way that the canopy itself would first be jettisoned as by similar jettisoning mechanism for the canopy itself.

It will thus be seen that I have invented an improved and simplified combined operating and jettisoning mechanism for movable members such as sliding or hinged canopies, escape hatches, chairs, and other aircraft components desirably both normally adjustable and jettisonable in an emergency.

I claim as my invention:

1. In combination with a reversible power source, a jack screw rotated thereby, a non-rotatable nut engaging said jack screw and adjustable therealong in response to rotation thereof, a piston head on the end of said jack screw, a pneumatic cylinder closed at one end and enclosing said jack screw and piston head, means for detachably engaging said nut in the open end of said cylinder, and means for introducing a pressure fluid into said cylinder between the closed end thereof and the piston head on the jackscrew, whereby to jettison the pneumatic cylinder in an emergency.

2. In combination with a reversible power source, a jack screw rotated thereby, a non-rotatable nut engaging said jack screw and adjustable therealong in response to rotation thereof, a piston head on the end of said jack screw, a pneumatic cylinder closed at one end enclosing said jack screw and piston head, means for detachably engaging said nut in the open end of said cylinder, gas pressure responsive means adapted to release said nut from said cylinder, and means for introducing a pressure fluid into said cylinder between the closed end thereof and the piston head on the jack screw, whereby to jettison the pneumatic cylinder in an emergency.

3. A device of the class described comprising a combined jack screw and pneumatic piston, a pneumatic cylinder enclosing said jack screw and piston and having an end closure cooperating with the pneumatic piston to form a chamber, nut means engaging said jack screw and releasably mounted in said pneumatic cylinder whereby rotation of said jack screw is adapted to produce relative motion between said cylinder and said jack screw, and means for supplying a pressure fluid to said chamber whereby to discharge said cylinder from said jack screw.

4. A device of the class described comprising a combined jack screw and pneumatic piston, a pneumatic cylinder enclosing said jack screw and piston and having an end closure cooperating with the pneumatic piston to form a chamber, nut means engaging said jack screw and mounted in said pneumatic cylinder whereby rotation of said jack screw is adapted to produce relative motion between said cylinder and said jack screw, gas pressure responsive means adapted to release said nut from said cylinder, and means for supplying a pressure fluid to said last mentioned means and said chamber whereby to discharge said cylinder from said jack screw.

5. In combination with a movable member adapted to be normally adjustable over a predetermined limited range of movement and jettisoned by movement beyond the limit of said normal range, of an operating mechanism therefor comprising a rotatable jack screw, a nut engaging therewith, a cylinder enclosing the jack screw and engaging said nut, said jack screw and cylinder being interconnected between the movable member and a relatively fixed point, and means for simultaneously disengaging the cylinder from the nut and discharging it from the jack screw, comprising a source of pressure fluid, means for introducing the pressure fluid into said cylinder and means actuated by said fluid to disengage the cylinder from said nut.

6. In combination with a movable member adapted to be normally adjustable over a predetermined limited range of movement and jettisoned by movement beyond the limit of said normal range, of an operating mechanism therefor comprising a rotatable jack screw, a nut engaging therewith, a cylinder enclosing the jack screw and engaging said nut, said jack screw and cylinder being interconnected between the movable member and a relatively fixed point, a latch carried by the cylinder and engaging said nut, fluid pressure means arranged to withdraw said latch, fluid pressure means arranged to discharge said cylinder from said jack screw, and means for simultaneously supplying fluid to both said fluid pressure means whereby to jettison said member.

7. In combination with a sliding member for airplanes which member is supported on tracks of finite length, of a mechanical operating mechanism interconnected between the member and the airplane for adjusting the position of said member within the length of the tracks therefor, and jettisoning means associated with said operating mechanism, comprising means for disconnecting said operating mechanism, and means for projecting the member beyond the limits of its finite tracks whereby to completely disengage said member from said airplane.

JAMES B. BEACH.

No references cited.